(12) United States Patent
Lee et al.

(10) Patent No.: US 12,663,855 B1
(45) Date of Patent: Jun. 23, 2026

(54) HOST, TRACKING SYSTEM, TRACKING METHOD

(71) Applicant: HTC Corporation, Taoyuan City (TW)

(72) Inventors: Tsung-Ju Lee, Taoyuan City (TW);
Sheng-Hui Tao, Taoyuan City (TW)

(73) Assignee: HTC Corporation, Taoyuan City (TW)

( * ) Notice: Subject to any disclaimer, the term of this
patent is extended or adjusted under 35
U.S.C. 154(b) by 5 days.

(21) Appl. No.: 18/991,685

(22) Filed: Dec. 22, 2024

(51) Int. Cl.
*G06F 3/01* (2006.01)
*G06T 7/50* (2017.01)
*G06T 7/73* (2017.01)

(52) U.S. Cl.
CPC .............. *G06F 3/011* (2013.01); *G06T 7/50*
(2017.01); *G06T 7/74* (2017.01); *G06T*
*2207/30196* (2013.01)

(58) Field of Classification Search
CPC ... G06F 3/011; G06T 7/74; G06T 7/50; G06T
2207/30196
See application file for complete search history.

(56) References Cited

U.S. PATENT DOCUMENTS

2014/0313228 A1 * 10/2014 Kasahara .............. G06T 19/006
345/633
2024/0099786 A1 * 3/2024 Calloway ............... A61B 34/30

OTHER PUBLICATIONS

"Office Action of Taiwan counterpart Application", issued on Aug.
25, 2025, p. 1-p. 7.

* cited by examiner

*Primary Examiner* — Robert J Michaud
(74) *Attorney, Agent, or Firm* — JCIPRNET

(57) ABSTRACT
A host, a tracking system, and a tracking method are
described herein. A storage circuit is configured to store a
program code. A processor is coupled to the storage circuit
and configured to access the program code to execute:
aligning a real coordinate system of a real world with a
virtual coordinate system of a virtual world; obtaining a
detecting status of a real object in the real world through an
object sensor; obtaining a reference status in the real world;
in response to a touch action to the real object, comparing
the detecting status with the reference status; and in response
to a status difference between the detecting status and the
reference status being greater than a threshold value, cali-
brating a virtual object coordinate of the virtual object.

20 Claims, 6 Drawing Sheets

200

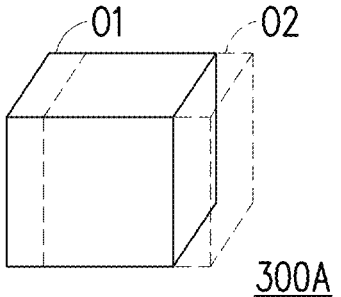
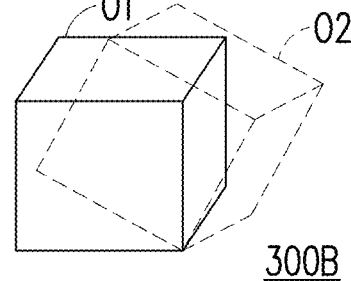
FIG. 3A                    FIG. 3B

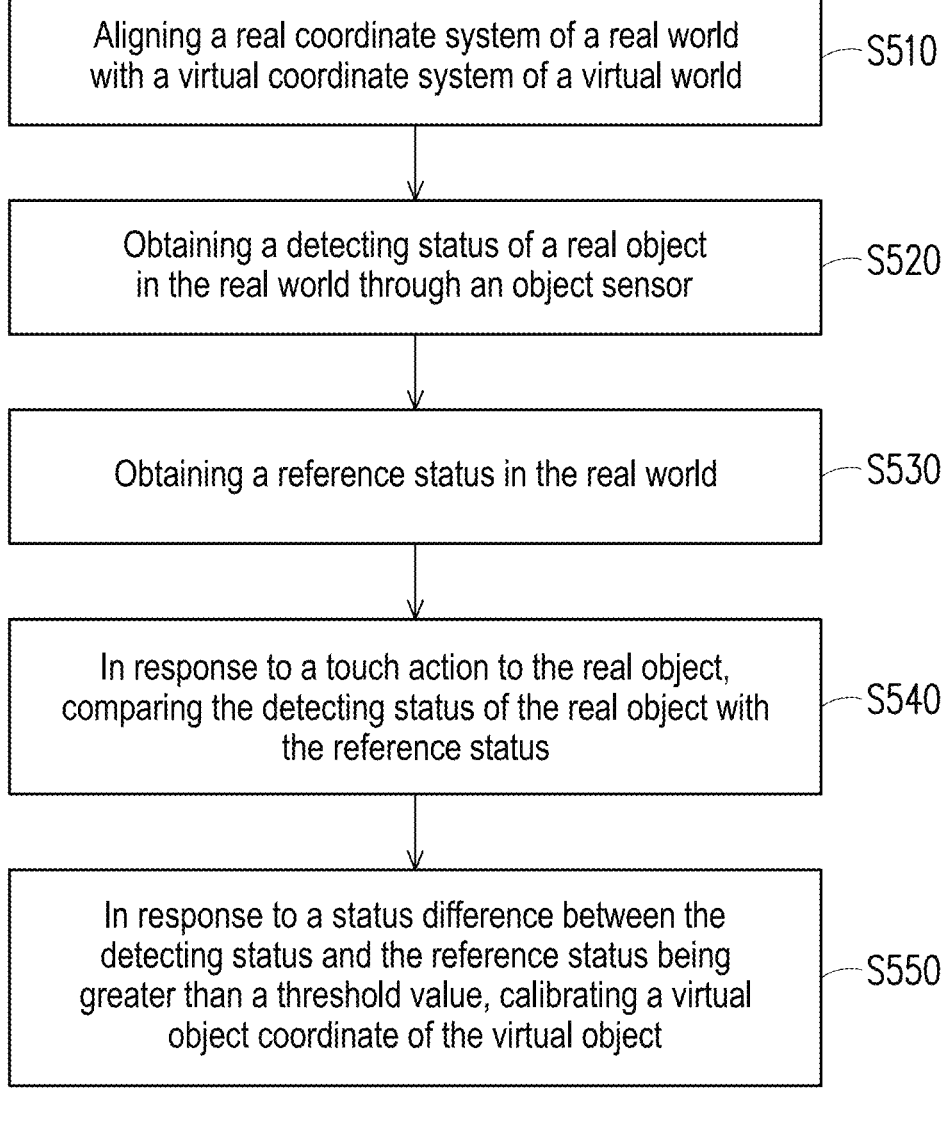

Aligning a real coordinate system of a real world with a virtual coordinate system of a virtual world ⎯S510

Obtaining a detecting status of a real object in the real world through an object sensor ⎯S520

Obtaining a reference status in the real world ⎯S530

In response to a touch action to the real object, comparing the detecting status of the real object with the reference status ⎯S540

In response to a status difference between the detecting status and the reference status being greater than a threshold value, calibrating a virtual object coordinate of the virtual object ⎯S550

HOST, TRACKING SYSTEM, TRACKING METHOD

BACKGROUND

Technical Field

The disclosure relates to a host; particularly, the disclosure relates to a host, a tracking system, and a tracking method.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a host, a tracking system, and a tracking method, so as to provide a cost-effective and convenient way to address the scale problem of AR devices.

The embodiments of the disclosure provide a host. The host includes a storage circuit and a processor. The storage circuit is configured to store a program code. The processor is coupled to the storage circuit and configured to access the program code to execute: aligning a real coordinate system of a real world with a virtual coordinate system of a virtual world; obtaining a detecting status of a real object in the real world through an object sensor; obtaining a reference status in the real world; in response to a touch action to the real object, comparing the detecting status with the reference status; and in response to a status difference between the detecting status and the reference status being greater than a threshold value, calibrating a virtual object coordinate of the virtual object.

The embodiments of the disclosure provide a tracking system. The tracking includes a user camera, an object sensor, a storage circuit and a processor. The user camera is configured to capture environmental images of an environment in a real world. The object sensor is configured to obtain a detecting status of a real object in the real world. The storage circuit is configured to store a program code. The processor is coupled to the storage circuit and configured to access the program code to execute: aligning a real coordinate system of a real world with a virtual coordinate system of a virtual world; obtaining the detecting status; obtaining a reference status in the real world; in response to a touch action to the real object, comparing the detecting status with the reference status; and in response to a status difference between the detecting status and the reference status being greater than a threshold value, calibrating a virtual object coordinate of the virtual object.

The embodiments of the disclosure provide a tracking method. The tracking method includes: aligning, through a processor, a real coordinate system of a real world with a virtual coordinate system of a virtual world; obtaining, through an object sensor, a detecting status of a real object in the real world; obtaining, through the processor, a reference status in the real world; in response to a touch action to the real object, comparing, through the processor, the detecting status with the reference status; and in response to a status difference between the detecting status and the reference status being greater than a threshold value, calibrating, through the processor, a virtual object coordinate of the virtual object.

Based on the above, according to the host, the tracking system, and the tracking method, a cost-effective and convenient way to address the scale problem of AR devices is achieved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3A is a schematic diagram of a tracking scenario according to an embodiment of the disclosure.

FIG. 3B is a schematic diagram of a tracking scenario according to an embodiment of the disclosure.

FIG. 5 is a schematic flowchart of a tracking method according to an embodiment of the disclosure.

DESCRIPTION OF THE EMBODIMENTS

Figure 1A:
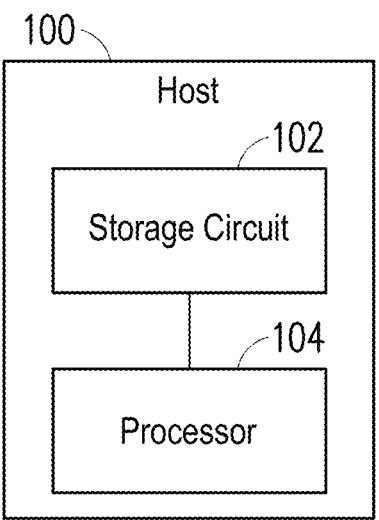
FIG. 1A is a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

For AR application, AR devices often struggle with accurately determining the scale of virtual objects relative to the real world. This misalignment may be addressed by incorporating external depth sensors, such as LiDAR or time-of-flight cameras. These depth sensors offer precise distance measurements, enabling the AR system to maintain accurate scale. However, the high cost of the depth sensors may be a barrier for widespread adoption. Therefore, it is the pursuit of people skilled in the art to provide a cost-effective and convenient way to address the scale problem of AR devices.

In this disclosure, when the user is touching a real object in the real world, a touch action may affect a status of the real object. Meanwhile, in response to the touch action, a detecting status of the real object is detected and a reference status in the real world is obtained. Then, the detecting status of the real object is compared with the reference status. Based on the comparison, an accurate scale of the real object is determined. Therefore, a cost-effective and convenient way to address the scale problem of AR devices is achieved.

FIG. 1A is a schematic diagram of a host according to an embodiment of the disclosure. In various embodiments, a host 100 may be any smart device and/or computer device.

In some embodiments, the host 100 may be any electronic device capable of providing reality services (e.g., AR/VR/MR services, or the like). In some embodiments, the host 100 may be implemented as an XR device, such as a pair of AR/VR glasses and/or a head-mounted display (HMD) device. In some embodiments, the host 100 may be a computer and/or a server, and the host 100 may provide the computed results (e.g., AR/VR/MR contents) to other external display device(s) (e.g., the HMD device), such that the external display device(s) can show the computed results to the user. However, this disclosure is not limited thereto.

In FIG. 1A, the host 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules and/or a program code that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules and/or the program code stored in the storage circuit 102 to implement the tracking method provided in the disclosure, which would be further discussed in the following.

Figure 1B:
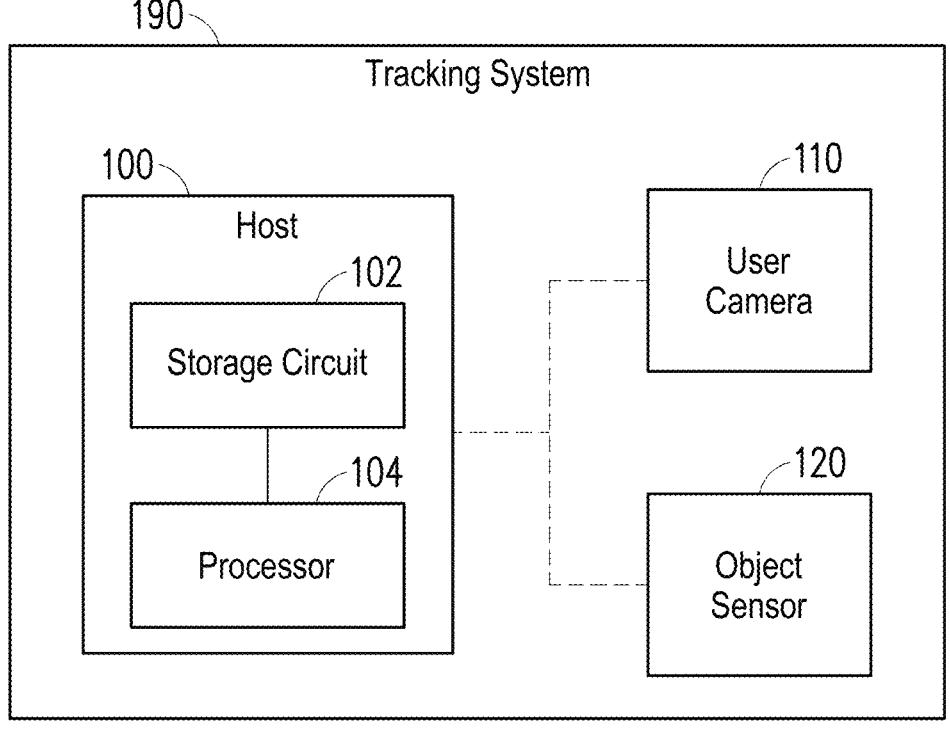
FIG. 1B is a schematic diagram of a tracking system according to an embodiment of the disclosure.

FIG. 1B is a schematic diagram of a tracking system according to an embodiment of the disclosure. In FIG. 1B, a tracking system 190 may include the host 100, a user camera 110, and an object sensor 120. The details of the host 100 may refer to FIG. 1A, while the details are not redundantly described seriatim herein.

In some embodiments, the host 100 may further include or communicate with the user camera 110. The user camera 110 may be, for example, a complementary metal oxide semiconductor (CMOS) camera, a charge coupled device (CCD) camera, other similar devices, or a combination of these devices. In some embodiments, the user camera 110 may be disposed on an HMD device, wearable glasses (e.g., AR/VR goggles), an electronic device, other similar devices, or a combination of these devices. However, this disclosure is not limited thereto. In the embodiments of the disclosure, the user camera 110 may be configured to capture environmental images of an environment in the real world where the host 100 locates, wherein the environmental images may be panoramas and/or cubemaps, but the disclosure is not limited thereto.

In some embodiments, the host 100 may further communicate with the object sensor 120 and the object sensor 120 may be an inside-out sensor or an outside-sensor. The inside-out sensor may be, for example, a simultaneous localization and mapping (SLAM) device, a gyroscope, an accelerometer, an inertial measurement unit (IMU) sensor, other similar devices, or a combination of these devices. The outside-in sensor may be, for example, infrared sensor for receiving an infrared emitted by another device, other similar devices, or a combination of these devices. However, this disclosure is not limited thereto.

In some embodiments, the host 100 may further include a communication circuit and the communication circuit may include, for example, a wired network module, a wireless network module, a Bluetooth module, an infrared module, a radio frequency identification (RFID) module, a Zigbee network module, or a near field communication (NFC) network module, but the disclosure is not limited thereto. That is, the host may communicate with the user camera 110 and/or the object sensor 120 through either wired communication or wireless communication.

In the embodiments of the disclosure, the tracking system 190 may utilize the host 100, the user camera 110, and the object sensor 120 to implement the tracking method provided in the disclosure, which would be further discussed in the following.

Figure 2:
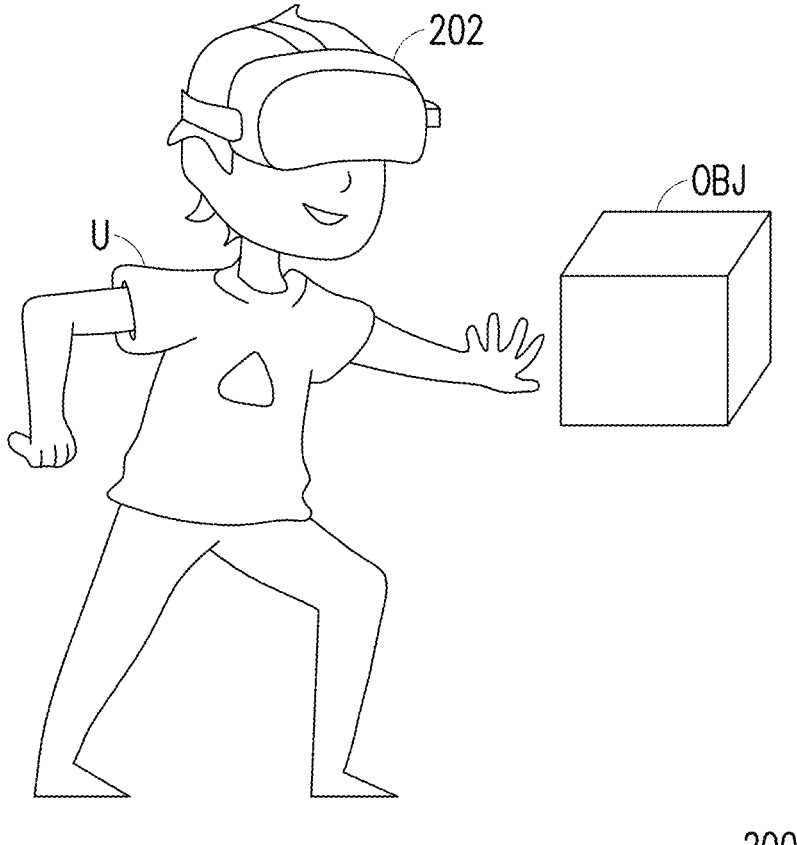
FIG. 2 is a schematic diagram of a tracking scenario according to an embodiment of the disclosure.

FIG. 2 is a schematic diagram of a tracking scenario according to an embodiment of the disclosure. Referring to FIG. 1B and FIG. 2, a tracking scenario 200 includes a user U, an HMD device 202, and a real object OBJ. In one embodiment, the host 100 and the user camera 110 may be included in the HMD device 202 and the object sensor 120 may be disposed on the real object OBJ. However, this disclosure is not limited thereto.

In FIG. 2, the user U may utilize the HMD device 202 to engage an AR experience. That is, the user U may interact with digital content overlaid on the real world via the HMD device 202. For example, the real object OBJ may be disposed in the real world. Then, the processor 104 of the HMD device 202 may be configured to align a real coordinate system of the real world with a virtual coordinate system of a virtual world (i.e., to form an AR world). That is, a virtual object corresponding to the real object OBJ may be displayed in the virtual world.

In one embodiment, the virtual object may be displayed based on information of the real object OBJ. For example, a detecting status of the real object OBJ may be obtained through the object sensor 120. That is, the virtual object may be displayed based on the detecting status and the virtual object should be precisely aligned with the real object OBJ. However, under certain circumstance, a misalignment between the virtual object and the real object OBJ may occur due to a scale problem of the user camera 110 and/or the object sensor 120. For example, the scale problem may be cause by a drift of an AR device (e.g., the user camera 110 or the object sensor 120). However, this disclosure is not limited thereto.

In order to calibrate the misalignment between the virtual object and the real object OBJ, a reference status in the real world may be obtained and used as a reference of a calibration. That is, the detecting status of the real object OBJ may be compared with the reference status. Further, based on a result of the comparison, the calibration may be performed. In other words, the processor 104 may be configured to: in response to a touch action to the real object OBJ, compare the detecting status with the reference status. Further, the processor 104 may be configured to: in response to a status difference between the detecting status and the reference status being greater than a threshold value, calibrate a virtual object coordinate of the virtual object. In this manner, a cost-effective and convenient way to address the scale problem of AR devices is achieved.

In one embodiment, the reference status may be a hand status of a hand of the user U. For example, when the user U is touching the real object OBJ, the real object OBJ may slightly move or rotate due to the touch action. In other words, when the user U is touching the real object OBJ, the hand and the real object OBJ may move or rotate synchronously. Therefore, the hand status of the hand of the user U may be used as the reference status to calibrate the misalignment between the virtual object and the real object OBJ.

In one embodiment, the reference status may be an image status of the real object OBJ and the image status is obtained through a camera (e.g., the user camera 110). For example, when the user U is touching the real object OBJ, the real object OBJ may slightly move or rotate due to the touch action. In other words, when the user U is touching the real object OBJ, the movement or the rotation may be obtained thought the user camera 110 and the object sensor 120 at the same time. Therefore, the image status of the real object OBJ may be used as the reference status to calibrate the misalignment between the virtual object and the real object OBJ.

In one embodiment, the reference status may be a pre-stored status of the real object OBJ. Further, the pre-stored status of the real object OBJ is pre-determined and stored in the storage circuit 102 when the real object OBJ is placed in the real world during an initial setup for the AR world. In other words, when the user U is touching the real object OBJ, the processor 104 may be configured to determine that whether the detecting status of the real object OBJ being same as the pre-stored status of the real object OBJ. Therefore, the pre-stored status of the real object OBJ may be used as the reference status to calibrate the misalignment between the virtual object and the real object OBJ.

In one embodiment, during the initial setup for the AR world, the real object OBJ may be disposed in a place where it is easily noticeable by the user U. Alternatively, the real object OBJ may be disposed in a place along a natural path of movement of the user U. For example, the real object OBJ may be disposed in a the middle of a real environment around the user U, in a place at the same height as the eyes of the user U, at the door, at the hallway, or other similar places. That is, the real object OBJ may be disposed in a place to ensure the visibility and/or accessibility of the real object OBJ to the user U. However, this disclosure is not limited thereto.

In one embodiment, the real object OBJ may be a self-tracking device. That is, the object sensor 120 may be disposed on the real object OBJ. That is, the object sensor 120 may be configured to obtain the detecting status of the real object OBJ. For example, the object sensor 120 may include at least one of an inside-out tracking device or an outside-in tracking device. However, this disclosure is not limited thereto.

It is noted that, when the misalignment occurs, the amount of the misalignment may determine a method for the calibration. For example, when the misalignment is too great, calibrating the misalignment at one time may lead to negative impact to the visual experience. That is, by correcting the status difference at one time, the user U may be experience visual incoherence, dizziness, or illusion. Therefore, in response to the status difference being greater than a calibration value, the processor 104 may be configured to calibrate a part of an error of the virtual object coordinate of the virtual object at one time. On the other hand, in response to the status difference not being greater than a calibration value, the processor 104 may be configured to calibrate an error of the virtual object coordinate of the virtual object at one time.

Moreover, when the misalignment occurs, a distance between the user U and the real object OBJ. For example, when the real object OBJ is far away from the user U, an accuracy of a status of the real object OBJ is not that important. That is, the calibration may be only performed when the distance between the user U and the real object OBJ is smaller than a calibration distance. In other words, in response to a distance between the real object OBJ and the user U being greater than a calibration distance, the processor 104 may be configured to not calibrate the virtual object coordinate of the virtual object. On the other hand, in response to the distance between the real object OBJ and the user U being not greater than the calibration distance, the processor 104 may be configured to calibrate the virtual object coordinate of the virtual object.

In addition, when the user U is approaching the real object OBJ, the distance between the real object OBJ and the user U may get smaller. That is, the distance being greater than the calibration distance may gradually get smaller and may become not being greater than the calibration distance. Since the distance is now not greater than the calibration distance, a calibration may be performed. It is worth mentioned that, in order to not bringing any negative impact to the visual experience, only part of the misalignment may be calibrated at one time. For example, when the distance is more than 3 meters, no calibration will be performed. Next, when the distance is between 1 to 3 meters, a first calibration may be performed to calibrate 50% of the misalignment. Then, when the distance is within 1 meter, a second calibration may be performed to calibrate a remaining part (e.g., 50%) of the misalignment. That is, in response to the status difference being greater than a threshold value and the user U being approaching the real object OBJ, the processor 104 may be configured to calibrate a part of an error of the virtual object coordinate of the virtual object at one time.

In one embodiment, there may be more than one object in the real world. For example, there may be a plurality of objects in the real world. Further, for the purpose of the calibration, when a calibration is performed, using an object with a closer distance may obtain a more accurate result. That is, among the plurality of objects, an object which is closest to the user U may be determined as the real object OBJ. In other words, in response to a plurality of objects being in the real world, the processor 104 may be configured to determine one of the plurality of objects with a minimal distance from a user U as the real object OBJ.

FIG. 3A is a schematic diagram of a tracking scenario according to an embodiment of the disclosure. FIG. 3B is a schematic diagram of a tracking scenario according to an embodiment of the disclosure. Referring to FIG. 3A and FIG. 3B, a tracking scenario 300A and a tracking scenario 300B respectively depict a movement and a rotation of an object when the user U touches the object.

Reference is first made to FIG. 3A. A first object O1 depicts a first status of an object and a second object O2 depicts a second status. For example, when the user U is touching the real object OBJ, the real object OBJ may slightly move due to the touch action. That is, the first object O1 may represent an original status of the real object OBJ and the second object O2 may represent an updated status (i.e., the detecting status) (e.g., result or change) of the real object OBJ due to the touch action. In other words, the detecting status of the real object OBJ may be a distance of a movement of the real object OBJ. Further, the reference status may be also a distance of the movement of the real object OBJ.

Reference is now made to FIG. 3B. A first object O1 depicts a first status of an object and a second object O2 depicts a second status. For example, when the user U is touching the real object OBJ, the real object OBJ may slightly rotate due to the touch action. That is, the first object O1 may represent an original status of the real object OBJ and the second object O2 may represent an updated status (i.e., the detecting status) (e.g., result or change) of the real object OBJ due to the touch action. In other words, the detecting status may be an angle of a rotation of the real object OBJ. Further, the reference status may be also an angle of the rotation of the real object OBJ.

In addition, the updated status of the real object OBJ may be represented by a coordinate, a pose, or a track due to the touch action. That is, the detecting status of the real object OBJ may be one of the distance, the angle, the coordinate, the pose, and the track. In the same way, the reference status may be one of the distance, the angle, the coordinate, the pose, and the track. However, this disclosure is not limited thereto.

Figure 4:
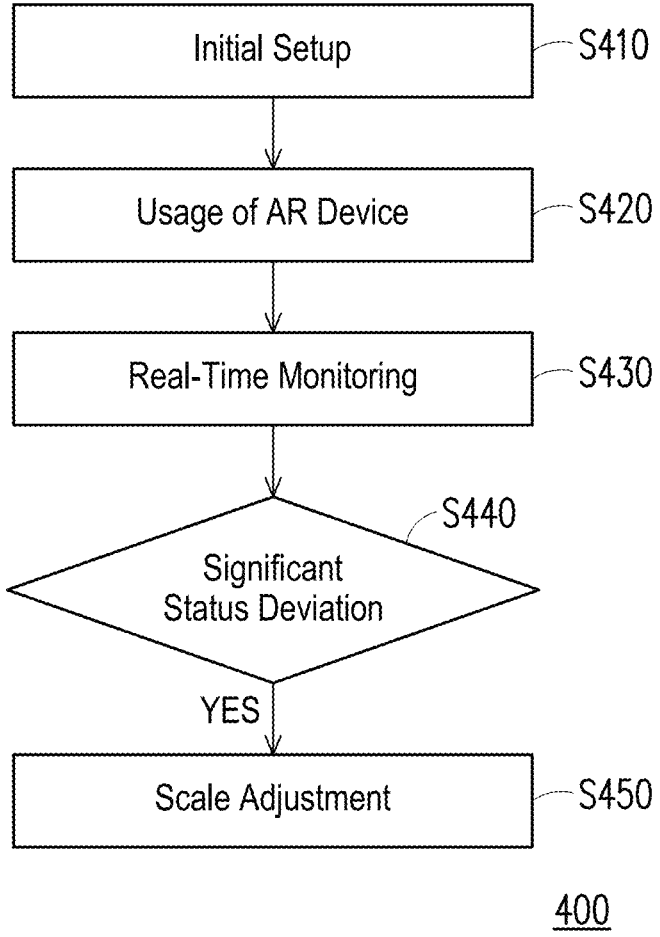
FIG. 4 is a schematic flowchart of a tracking method according to an embodiment of the disclosure.

FIG. 4 is a schematic flowchart of a tracking method according to an embodiment of the disclosure. In FIG. 4, the tracking method 400 includes steps S410-S450.

In the step S410, an initial setup for an AR world is performed. The initial setup may include obtaining a floor-plan of the real world, defining an origin and coordinate axes of the AR worlds, placing the real object OBJ in the real world, determining a coordinate of the real object, and storing the coordinate.

In the step S420, a usage of an AR device is performed. The usage of the AR device includes aligning a real coordinate system of the real world (which is defined in the step S410) with a virtual coordinate system of a virtual world to form the AR world.

In the step S430, a real-time monitoring is performed. The real-time monitoring includes detecting any significant change in the status of the real objects. In the step S440, whether a significant status deviation occurs is determined. In the step S450, in response to the significant status deviation, a scale adjustment is performed.

In this manner, a cost-effective and convenient way to address the scale problem of AR devices is achieved.

FIG. 5 is a schematic flowchart of a tracking method according to an embodiment of the disclosure. In FIG. 5, the tracking method 400 includes steps S510-S550.

In the step S510, the processor 104 is configured to align a real coordinate system of a real world with a virtual coordinate system of a virtual world. In the step S520, the processor 104 is configured to obtain a detecting status of a real object OBJ in the real world through an object sensor 120. In the step S530, the processor 104 is configured to obtain a reference status in the real world. In the step S540, the processor 104 is configured to: in response to a touch action to the real object OBJ, compare the detecting status with the reference status. In the step S550, the processor 104 is configured to: in response to a status difference between the detecting status and the reference status being greater than a threshold value, calibrate a virtual object coordinate of the virtual object.

In addition, the implementation details of the tracking method 500 may be referred to the descriptions of FIG. 1 to FIG. 4 to obtain sufficient teachings, suggestions, and implementation embodiments, while the details are not redundantly described seriatim herein.

In summary, according to the host 100, the tracking system 190, and the tracking method 500, since a change of the status of the real object OBJ due to the touch action is monitored, the change of the status may be used as a reference for a calibration of the misalignment between the virtual object and the real object OBJ. In this manner, a cost-effective and convenient way to address the scale problem of AR devices is achieved.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A host, comprising:
   a storage circuit, configured to store a program code; and
   a processor, coupled to the storage circuit and configured to access the program code to execute:
   aligning a real coordinate system of a real world with a virtual coordinate system of a virtual world;
   obtaining a detecting status of a real object in the real world through an object sensor;
   obtaining a reference status in the real world;
   in response to a touch action to the real object, comparing the detecting status with the reference status; and
   in response to a status difference between the detecting status and the reference status being greater than a threshold value, aligning a virtual object coordinate of the virtual object with a real object coordinate of the real object.

2. The host according to claim 1, wherein the reference status is a hand status of a hand of a user.

3. The host according to claim 1, wherein the reference status is an image status of the real object and the image status is obtained through a camera.

4. The host according to claim 1, wherein the reference status is a pre-stored status of the real object, wherein the pre-stored status of the real object is pre-determined and stored in the storage circuit when the real object is placed in the real world during an initial setup for an augmented reality world.

5. The host according to claim 1, wherein the real object is a self-tracking device and the object sensor is disposed on the real object, the object sensor is configured to obtain the detecting status of the real object, and the object sensor comprises at least one of an inside-out tracking device or an outside-in tracking device.

6. The host according to claim 1, wherein the processor is further configured to access the program code to execute:
   in response to the status difference being greater than a calibration value, calibrating a part of an error of the virtual object coordinate of the virtual object at one time; and
   in response to the status difference not being greater than a calibration value, calibrating an error of the virtual object coordinate of the virtual object at one time.

7. The host according to claim 1, wherein the processor is further configured to access the program code to execute:
   in response to a distance between the real object and a user being greater than a calibration distance, not calibrating the virtual object coordinate of the virtual object; and
   in response to the distance between the real object and the user being not greater than the calibration distance, calibrating the virtual object coordinate of the virtual object.

8. The host according to claim 1, wherein the processor is further configured to access the program code to execute:
   in response to the status difference being greater than a threshold value and the user being approaching the real object, calibrating a part of an error of the virtual object coordinate of the virtual object at one time.

9. The host according to claim 1, wherein the processor is further configured to access the program code to execute:

in response to a plurality of objects being in the real world, determining one of the plurality of objects with a minimal distance from a user as the real object.

10. The host according to claim 1, wherein he detecting status of the real object is one of a distance, an angle, a coordinate, a pose, and a track due to the touch action.

11. A tracking system, comprising:

a user camera, configured to capture environmental images of an environment in a real world;

an object sensor, configured to obtain a detecting status of a real object in the real world;

a storage circuit, configured to store a program code; and a processor, coupled to the storage circuit and configured to access the program code to execute:

aligning a real coordinate system of the real world with a virtual coordinate system of a virtual world;

obtaining the detecting status;

obtaining a reference status in the real world;

in response to a touch action to the real object, comparing the detecting status with the reference status; and in response to a status difference between the detecting status and the reference status being greater than a threshold value, aligning a virtual object coordinate of the virtual object with a real object coordinate of the real object.

12. The tracking system according to claim 11, wherein the reference status is a hand status of a hand of a user.

13. The tracking system according to claim 11, wherein the reference status is an image status of the real object and the image status is obtained through the user camera.

14. The tracking system according to claim 11, wherein the reference status is a pre-stored status of the real object, wherein the pre-stored status of the real object is pre-determined and stored in the storage circuit when the real object is placed in the real world during an initial setup for an augmented reality world.

15. The tracking system according to claim 11, wherein the real object is a self-tracking device and the object sensor is disposed on the real object, and the object sensor comprises at least one of an inside-out tracking device or an outside-in tracking device.

16. The tracking system according to claim 11, wherein the processor is further configured to access the program code to execute:

in response to the status difference being greater than a calibration value, calibrating a part of an error of the virtual object coordinate of the virtual object at one time; and in response to the status difference not being greater than a calibration value, calibrating an error of the virtual object coordinate of the virtual object at one time.

17. The tracking system according to claim 11, wherein the processor is further configured to access the program code to execute:

in response to a distance between the real object and a user being greater than a calibration distance, not calibrating the virtual object coordinate of the virtual object; and in response to the distance between the real object and the user being not greater than the calibration distance, calibrating the virtual object coordinate of the virtual object.

18. The tracking system according to claim 11, wherein the processor is further configured to access the program code to execute:

in response to the status difference being greater than a threshold value and the user being approaching the real object, calibrating a part of an error of the virtual object coordinate of the virtual object at one time.

19. The tracking system according to claim 11, wherein the processor is further configured to access the program code to execute:

in response to a plurality of objects being in the real world, determining one of the plurality of objects with a minimal distance from a user as the real object.

20. A tracking method, comprising:

aligning, through a processor, a real coordinate system of a real world with a virtual coordinate system of a virtual world;

obtaining, through an object sensor, a detecting status of a real object in the real world;

obtaining, through the processor, a reference status in the real world;

in response to a touch action to the real object, comparing, through the processor, the detecting status with the reference status; and in response to a status difference between the detecting status and the reference status being greater than a threshold value, aligning, through the processor, a virtual object coordinate of the virtual object with a real object coordinate of the real object.

* * * * *